(12) United States Patent
Stevens et al.

(10) Patent No.: US 8,661,292 B2
(45) Date of Patent: Feb. 25, 2014

(54) NETWORK COMMUNICATION AT UNADDRESSED NETWORK DEVICES

(75) Inventors: Michael Stevens, Fountain, CO (US); Sam Bauer, Colorado Springs, CO (US); Takashi Hidai, Palo Alto, CA (US); John M. Page, Colorado Springs, CO (US); Canning Hsueh, Colorado Springs, CO (US); Vonn L. Black, Colorado Springs, CO (US)

(73) Assignee: JDS Uniphase Corporation, Milpitas, CA (US)

( * ) Notice: Subject to any disclaimer, the term of this patent is extended or adjusted under 35 U.S.C. 154(b) by 340 days.

(21) Appl. No.: 13/107,790

(22) Filed: May 13, 2011

(65) Prior Publication Data

US 2011/0283140 A1 Nov. 17, 2011

Related U.S. Application Data

(60) Provisional application No. 61/334,980, filed on May 14, 2010, provisional application No. 61/334,962, filed on May 14, 2010, provisional application No. 61/355,040, filed on Jun. 15, 2010, provisional application No. 61/355,075, filed on Jun. 15, 2010.

(51) Int. Cl.
*G06F 11/00* (2006.01)
(52) U.S. Cl.
USPC .......................................... 714/27; 709/224
(58) Field of Classification Search
USPC ................... 714/27, 25, 43; 709/224
See application file for complete search history.

(56) References Cited

U.S. PATENT DOCUMENTS

| | | | |
|---|---|---|---|
| 5,185,860 A | 2/1993 | Wu | 709/224 |
| 6,108,782 A | 8/2000 | Fletcher et al. | 713/153 |
| 6,286,039 B1 | 9/2001 | Van Horne et al. | 709/221 |
| 7,336,673 B2 | 2/2008 | Ilnicki et al. | 370/412 |
| 7,337,233 B2 * | 2/2008 | Dillon | 709/232 |
| 7,506,065 B2 | 3/2009 | LaVigne et al. | 709/245 |
| 7,688,754 B2 | 3/2010 | Williams | 370/253 |
| 7,733,773 B2 | 6/2010 | Wager et al. | 370/230 |
| 7,804,832 B2 | 9/2010 | Andrews et al. | 370/390 |
| 2001/0039579 A1 | 11/2001 | Trcka et al. | 709/224 |
| 2003/0223376 A1 | 12/2003 | Elliott et al. | 370/249 |
| 2004/0001443 A1 | 1/2004 | Soon et al. | 370/244 |
| 2004/0208129 A1 | 10/2004 | Old et al. | 370/241 |
| 2006/0259966 A1 * | 11/2006 | Ilnicki | 726/22 |
| 2007/0006292 A1 * | 1/2007 | Jaenicke | 726/11 |
| 2008/0285452 A1 | 11/2008 | Oran | 370/235 |
| 2011/0158240 A1 | 6/2011 | Sun et al. | 370/392 |

FOREIGN PATENT DOCUMENTS

| | | | |
|---|---|---|---|
| GB | 2426145 | 11/2006 | H04L 12/26 |
| WO | 2009001067 | 12/2008 | H04L 12/26 |

OTHER PUBLICATIONS

European Search Report from EP application No. 11165681.5.

(Continued)

*Primary Examiner* — Yolanda L Wilson
(74) *Attorney, Agent, or Firm* — Matthew A. Pequignot; Pequignot + Myers LLC

(57) ABSTRACT

A method of network testing relies on communication with an unaddressed test device. The method includes collection of network addresses from packets passing through the test device and a discovery procedure. The collected addresses are provided to a remote control device, and used for communication between the test device and the control device.

21 Claims, 6 Drawing Sheets

(56) References Cited

OTHER PUBLICATIONS

Kaeo et al., "Methodology for Benchmarking IPsec Devices; draft-ietf-bmwg-ipsec-met h-05.txt", Methodology for Benchmarking IPsec Devices; Draft-Ietf-Bmwg-ipsec-Met H-05.Txt, Internet Engineering Task Force, IETF; Standardworkingdraft, Internet Society (ISOC) 4, Rue Des Falaises CH-1205 Geneva, Switzerland, vol. bmwg, No. 5, Jul. 28, 2009, XP015063661.

European Search Report from EP application No. 11165728.4.
Claise et al., "Packet Sampling (PSAMP) Protocol Specifications; rfc5476.txt", Packet Sampling (PSAMP) Protocol Specification; RFC5476 Txt, Internet Engineering Task Force, IETF; Standard, Internet Society (ISOC) 4, Rue Des Falaises Ch- 1205 Geneva, Switzerland, Mar. 1, 2009, XP015065545.
European Search Report from EP application No. 11165984.3.
Enns et al., "Device Discovery Protocol (DDP) draft-marques-ddp-00.txt; draft-marques-ddp00.txt", IETF Standard-Working-Draft, Internet Engineering Task Force, IETF, CH, May 2003.

\* cited by examiner

| 0 | 1 | 2 | 3 | 4 | 5 | 6 | 7 | 8 | 9 | 1 0 | 1 1 | 1 2 | 1 3 | 1 4 | 1 5 | 1 6 | 1 7 | 1 8 | 1 9 | 2 0 | 2 1 | 2 2 | 2 3 | 2 4 | 2 5 | 2 6 | 2 7 | 2 8 | 2 9 | 3 0 | 3 1 |
|---|---|---|---|---|---|---|---|---|---|---|---|---|---|---|---|---|---|---|---|---|---|---|---|---|---|---|---|---|---|---|---|
| MAC Destination ||||||||||||||||||||||||||||||||
| MAC Destination (cont) |||||||||||||||| MAC Source ||||||||||||||||
| MAC Source (cont) ||||||||||||||||||||||||||||||||
| Ether Type/Len |||||||||||||||| Ver |||| IHL |||| Type of Service ||||||||
| Total Length |||||||||||||||| Identification ||||||||||||||||
| Flags ||| Fragment Offset ||||||||||||| Time to Live |||||||| Protocol ||||||||
| Header Checksum |||||||||||||||| Source Address ||||||||||||||||
| Source Address (cont) |||||||||||||||| Destination Address ||||||||||||||||
| Destination Address (cont) |||||||||||||||| Source Port ||||||||||||||||
| Destination Port |||||||||||||||| Length ||||||||||||||||
| Checksum ||||||||||||||||||||||||||||||||
| Variable length data of interest ||||||||||||||||||||||||||||||||
| Ethernet Checksum ||||||||||||||||||||||||||||||||

NETWORK COMMUNICATION AT UNADDRESSED NETWORK DEVICES

CROSS-REFERENCE TO RELATED APPLICATIONS

The present invention claims priority from U.S. Provisional Patent Application No. 61/334,980 filed May 14, 2010; U.S. Provisional Patent Application No. 61/334,962 filed May 14, 2010; U.S. Provisional Patent Application No. 61/355,040 filed Jun. 15, 2010; and U.S. Provisional Patent Application No. 61/355,075 filed Jun. 15, 2010, all of which are incorporated herein by reference for all purposes.

TECHNICAL FIELD

The present invention relates generally to networking and communications technology and, more particularly, to methods of testing a network and devices therein.

BACKGROUND OF THE INVENTION

Communication networks are widely used today; the variety of networks includes the Internet, wide-area networks (WANs), local-area networks (LANs), telephony networks, and wireless networks. The importance of network monitoring and testing is growing as well as the requirements for related methods and equipment. Of particular importance are distributed test systems and methods relying on a distributed set of devices. Such systems and methods allow for centralized control of multiple test devices, their synchronization, and for receiving results remotely.

In distributed test systems, the devices must be able to communicate over a network, for example using a data link layer address (Ethernet address or MAC Address) or an IP address.

Conventionally, a device in a network requires an IP address to communicate with it over an IP routed network. If a device doesn't have an IP address it can only be communicated with on the local subnet by utilizing MAC level protocols. Some devices, like intelligent network taps, passively tap a network to provide access to the packets and therefore require an IP address and often a separate management network connection. There are disadvantages to having IP addresses on large numbers of devices and separate management networks due to cost and scalability.

In order to minimize the total number of IP addresses required on a network, certain devices such as test devices may be not assigned a unique IP address. Therefore, there is a need to communicate with such unaddressed test devices and to provide a distributed test system including unaddressed test devices, and a method of testing a communication network or device using an unaddressed, yet remotely-controlled test device.

Accordingly, there is a need to mitigate the disadvantages of existing test systems and methods and to provide a novel method and a system for testing a communication network or a device therein.

SUMMARY OF THE INVENTION

A method is provided for testing a network, the method includes:
(a) providing a test device connected inline in the network, wherein the test device has one or more authentication patterns stored therein, and wherein the test device has memory for storing a set of collected network addresses;
(b) examining received packets at the test device;
(c) if one of the received packets includes none of the authentication patterns, adding a destination address or a source address of said packet to a set of collected network addresses, and forwarding said packet from the test device to the destination address of said packet without any change to said packet;
(d) originating a test device identification packet, at the test device wherein a source address of the test device identification packet is one from the set of collected network addresses, and wherein the test device identification packet includes one of the authentication patterns;
(e) if one of the received packets is a request packet matching any of the authentication patterns and having a test parameter, forming a test result packet at the test device, wherein the test result packet includes one of the authentication patterns; and, sending the test result packet from the test device to a source address of the request packet, wherein a source address of the test result packet is one from the set of collected network addresses and identifies a first downstream device that is downstream from the test device with respect to packets originated at the device having the source address of the request packet.

The authentication patterns may include a discovery pattern, and one of the received packets may be a discovery packet having the discovery pattern; then the test device sends the test device identification packet in response to receiving the discovery packet, and a destination address of the test device identification packet is the source address of the discovery packet. The test result packet may include a test result defined by the test parameter. The request packet may be terminated at the test device.

At an unaddressed device connected inline in a network, a method of communication includes:
(a) examining received packets at the unaddressed device;
(b) if one of the received packets includes none of one or more authentication patterns stored within the unaddressed device, adding a destination address or a source address of said packet to a set of collected network addresses, and forwarding said packet from the unaddressed device to the destination address of said packet;
(c) originating a device identification packet, at the unaddressed device, wherein a source IP address of the device identification packet is one from the set of collected network addresses, and wherein the device identification packet includes one of the authentication patterns;
(d) if one of the received packets is a request packet matching any of the authentication patterns, forming a reply packet at the unaddressed device, wherein the reply packet includes one of the authentication patterns, and sending the reply packet from the unaddressed device to a source address of the request packet, wherein a source address of the reply packet is one from the set of collected network addresses and identifies a downstream device that is downstream from the unaddressed device with respect to packets originated at the device having the source address of the request packet.

The method of communication employed by the unaddressed device may include termination of the request packet at the unaddressed device. The authentication patterns may include an identification number of the unaddressed device, and the device identification packet may include the identification number of the test device. A payload of the device identification packet or the reply packet may include one or more addresses from the set of collected network addresses. The authentication patterns may include a discovery pattern, and one of the received packets may be a discovery packet having the discovery pattern, accordingly the unaddressed device may send the device identification packet in response to receiving the discovery packet, and a destination address of the device identification packet would be the source address of the discovery packet.

BRIEF DESCRIPTION OF THE DRAWINGS

The invention will be described in greater detail with reference to the accompanying drawings which represent preferred embodiments thereof, wherein:

FIG. 3 is a structure of a IP packet (prior art);

DETAILED DESCRIPTION OF EXEMPLARY EMBODIMENTS

Figure 1:
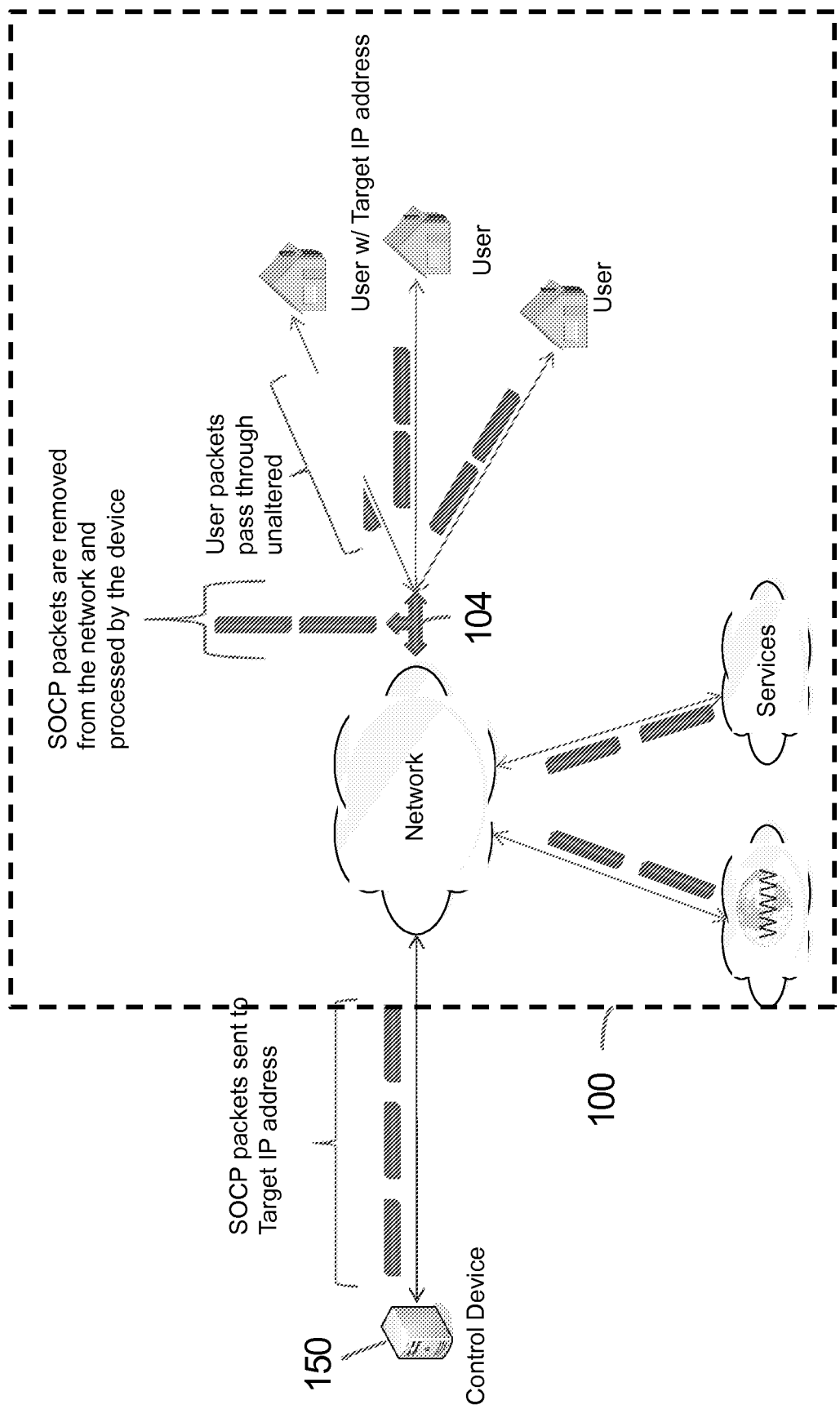
FIG. 1 is a schematic diagram of a test system including an unaddressed test device.

With reference to FIG. 1, a test system includes a control device 150 and at least one, but more practically, a plurality of unaddressed test devices 104 inserted inline in a communication network 100. The test system implements a method of network testing which includes communication with unaddressed devices. More precisely, an "unaddressed" device may have or have not a network address; however the method disclosed therein makes no use of addresses of test devices, treating them effectively as "unaddressed" devices. By way of example, the test device 104 may be a transceiver plugged into a network device which is another device with respect to the transceiver.

Communication with an unaddressed test device relies on inspection of packets passing through the test device and comparing the content of the packets.

Figure 2:
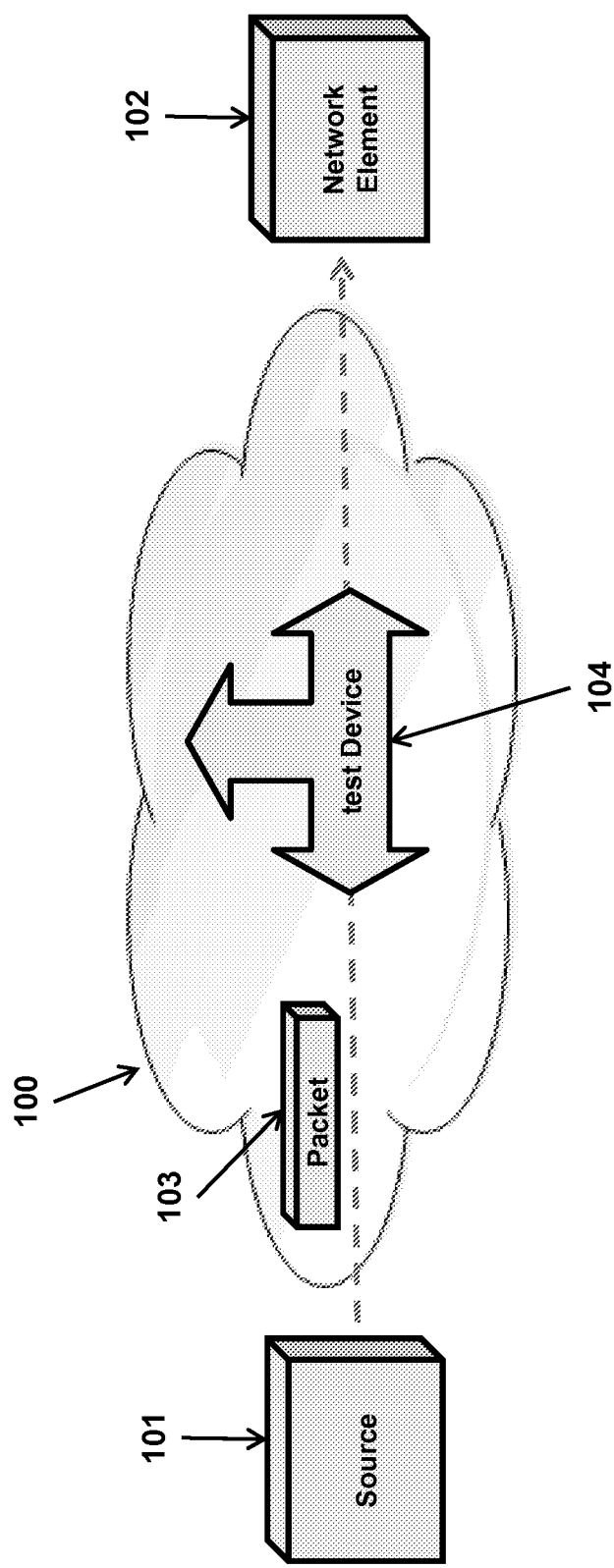
FIG. 2 is a schematic diagram of a test device connected inline in a network.

With reference to FIG. 2, a test device 104 is connected inline in a network 100 so that packets passing between at least two devices on the network, in this case between a data source device 101 and a destination device 102, pass through the test device 104. The test device 104 implements a method of network testing which may include passive monitoring, active testing, or a combination of both, as well as testing a subnetwork, link, or a device.

The test device 104 may be a protocol-generic test device employed in communication network 100 for monitoring packets communicated across the network 100, such as a packet 103 being communicated in this illustrative example from the source 101 to the destination 102.

The communication network 100 may be any type of packet network, currently known or later developed, including the Internet, WAN, LAN, Multi-label Packet Switching (MPLS) networks, telephony network, wireless network, optical network, and/or any combination of the foregoing. Preferably, the communication network 100 is a packet-switched network or any type of network that uses addressing for packet, cell or frame delivery. Such networks include but are not limited to Asynchronous Transfer Mode (ATM) networks, Frame Relay networks, Hybrid fiber-coaxial (HFC) networks, and Synchronous Optical Network/Synchronous Digital Hierarchy (SONET/SDH) networks. The current design is for packet based networks, but the invention could be useful in other kinds of networks. Accordingly, the term "packet" should be understood as including conventional packets, such as IP and Ethernet packets, as well as cells and frames. While only two devices 101 and 102 are shown as communicatively coupled via the communication network 100 in FIG. 2, it should be understood that any number of devices may be so connected. Further, while the device 101 is indicated as a source and the device 102—as a destination, it will be appreciated that communication may be bi-directional such that in some instances the device 102 is a source and the device 101 is a destination.

The test device 104 has no network addresses, or at least does not use them in the method presented herein.

The test device 104 is connected inline in the network 100 and is capable of inspecting and/or capturing packets traveling from source 101 to destination 102, and examining the received packets. The test device 104 has one or more authentication patterns stored therein, preferably including an identification number (ID) of the test device and a predetermined "hello" pattern. The authentication patterns allow the test device 104 to recognize, among the received packets, packets intended to the test device 104 and including information targeted to the test device 104, such as test or configuration information.

In the example of FIG. 2, the packet 103 travels from the source 101 to the destination 102 and is intercepted by the test device (or "probe") 104. Protocol-generic test device 104 may recognize packet 103 as a special test/configuration packet by scanning for and finding an ID embedded in the packet's payload. The ID may have been injected into the packet's payload by the source of the packet. For example, the control device 150 may form the packet 103, and insert the ID of the test device 104 and other information intended for 104. Alternatively, a source of the packet 103 may also be a test device, and may clone a passing-by packet and change its content (payload) by inserting the ID and other information intended for the test device 104.

The test device 104 has memory wherein a set of collected network addresses may be stored. Initially the set is empty and grows as the test device collects network addresses from passing packets. Alternatively, one or more network addresses may be populated into non-volatile memory in 104.

The test device 104 examines received packets exemplified by the packet 103 in FIG. 2. In operation, the test device 104 performs three functions: collecting network addresses for use in communication with the control device 150, advertising itself to the control device 150 in a discovery procedure, and performing actual testing/monitoring of the network under remote control of the control device.

If the packet 103 is not intended to the test device 104, i.e. the packet 103 includes none of the authentication patterns stored in the device 104, the packet 103 is forwarded to the destination address of the packet without any change to the packet 103. However, the test device collects the destination address and/or the source address from the packet 103 and adds the collected network address(es) to the set of collected network addresses.

The collected network addresses, or at least some of them, are to be provided to the control device 150, or another test device, so as to establish communication with this test device 104.

Generally speaking, the test device 104 forwards all packets to their destinations, with the exception of the packets intended to the test device 104. In other words, the packets which include none of the predetermined identification patterns should be forwarded without any changes.

A discovery procedure may be initiated at the control device 150 by sending a discovery packet e.g. to the network element 102, wherein the discovery packet has a predefined authentication pattern known to the test device 104, such as the "hello" pattern stored in the test device 104.

If the discovery packet with the "hello" pattern passes through the test device 104, while examining the received packets, the test device 104 will recognize the discovery packet by the presence of the discovery pattern ("hello"). After receiving the discovery packet, the test device 104 originates a test device identification packet which includes one of the authentication patterns, e.g. the ID number of this particular test device 104. A source address of the test device identification packet is one from the set of collected network addresses, e.g. of the device 102, and a destination address of the test device identification packet is the source address of the discovery packet, so that the device identification packet will reach the sender of the discovery packet. The payload of the test device identification packet may include one or more addresses from the set of collected network addresses.

The control device 150 performs discovery in a scheduled and controlled way so as to not cause a flood of network traffic that would disrupt normal production traffic or services. The discovery packet(s) may be send as broadcast or unicast request(s) and repeated with a configurable interval.

A Discovery Manager Component of the control device 150 is responsible for initiating the discovery process, for collecting data incoming from the test devices such as test device 104, and for populating a database. Finally, the discovery procedure is initiated at the Discovery Manager when prompted by a System Manager; the Discovery Manager reports discovered test devices back to the System Manager e.g. at regular intervals as specified by the System Manager.

The Discovery Manager Component uses a Test Device Communication Stack to send a discovery packet onto the network. The packet may be a broadcast, subnet directed broadcast, a unicast or a series of unicasts. The types of discovery packets sent are specified by the System Manager; as are the addresses to be used and the interval at which discovery packets should be posted to the network.

Incoming results packets, such as the test device identification packet originated at the test device 104, are routed to the Discovery Manager Component from the test device Communication Stack via the open socket. The Discovery Manager Component will record the discovered test devices and corresponding egress network addresses in a database with a discovery timestamp.

By way of example, since the test device 104 does not have its own IP and MAC addresses for accessing the network, it has to use the IP address of one of its egress devices as its own IP address and use the next hop downstream (directing away from the control device 150) MAC address as its own MAC address. The control device 150 uses this 'spoofed' IP address as the destination IP address to send command and control packets to the test device 104.

Alternatively, the discovery procedure may be initiated by the test device 104 by originating a test device identification packet which includes at least one of the authentication patterns; the "hello" pattern or the ID number of this particular test device 104, preferably both. A source address of the test device identification packet is one from the set of collected network addresses, e.g. of the device 102; a destination address of the test device identification packet may be an arbitrary address.

Figure 4:
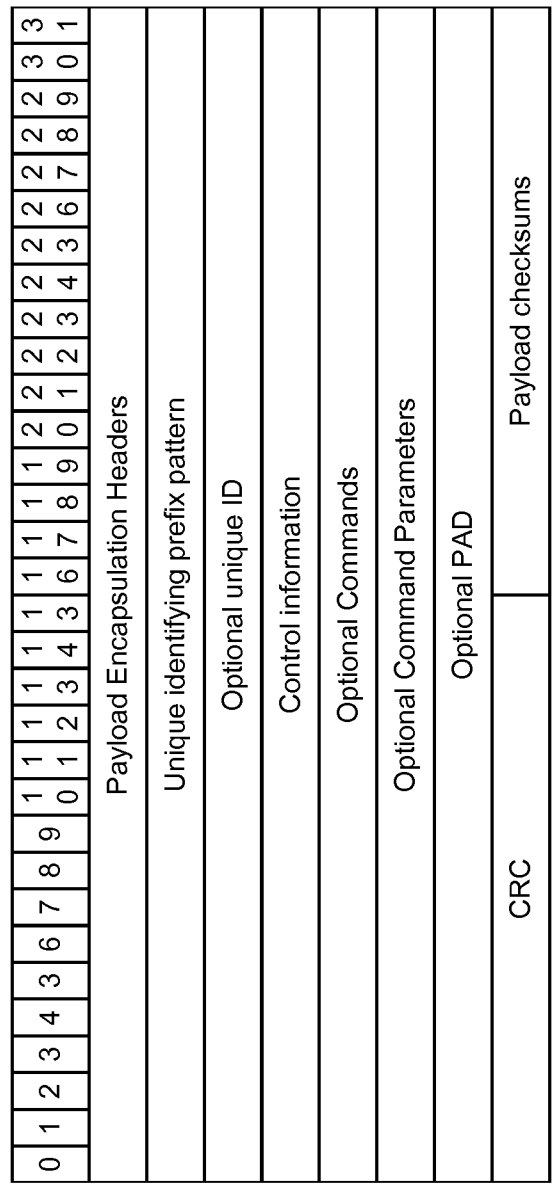
FIG. 4 is an exemplary structure of a communication packet intended to the test device.

An exemplary configuration of the packet 103 according to one embodiment is shown in FIG. 3 as an IP packet. The IP packet includes a packet header and payload which could contain packet headers for other protocols such as User Datagram Protocol (UDP). With reference to FIG. 4, the packet further includes authentication patterns in the form of unique identification information and an ID, followed by content that is intended for the test device 104. When the packet 103 has any of the authentication patterns, the packet may be referred to as a carrying or envelope packet, and portions of the packet may be referred to as an embedded or message packet. The message portion of the packet may include the ID of the test device 104, information of interest, and also includes optional command and control information used for authentication and encryption. In this example, the optional authentication info could be a hash-based message authentication code (HMAC) token, which is generated using a well-known authentication technique. Additionally, encryption keys could be included and used for encryption or initiating encryption in subsequent packets 103. Of course, any other authentication or encryption technique now known or later developed may be employed in other embodiments.

It should be recognized that embodiments of the present invention do not negate existing methods, but rather extend them by specifying that a special packet intended for an test device can be identified by some form of identity embedded into the packet's header and payload. For instance, in order for a test/configuration packet 103 to be recognized as a special packet by protocol generic test device 104, the test device is to know unique identifiers from FIG. 4 that can be inserted for identifying packets as special; the identifiers represent the authentication patterns stored in the test device for use in comparison with potential identifiers included in received packets. FIG. 4 denotes multiple sets of unique identifiers. There may be unique identifiers that denote the packet as a packet of interest to multiple test devices and identifiers that denote the packet as targeted at the particular test device 104. For example, the unique identifying information could be a unique MAC address of a specific probe, a multicast MAC address that addresses a community of probes or a specific port or protocol identifier. The location of an authentication pattern in the packet 103 may be predetermined and known to the originator of the packet 103 and the probe(s) 104. The unique identifiers may be a string of bytes or any pattern, which may be referred to as a "fingerprint," that is inserted into the packet's payload and demarcated with known strings, similar to tags used in XML/HTML. As another example, an authentication pattern may be a pattern that is arranged at or beyond a well-known offset from the beginning of the frame/packet or specific packet header. It should be noted that the identifiers do not have to be inserted exactly at the offset, but rather at a location beyond the offset such that protocol-generic test device 104 may be implemented to begin its search through the packet after such offset looking for unique identifiers. In other words, protocol-generic test device 104 may perform pattern matching starting from the offset point in the packet to determine if the unique identifier is found. Of course, an offset location and ID size does not have to be predefined.

Figure 5:
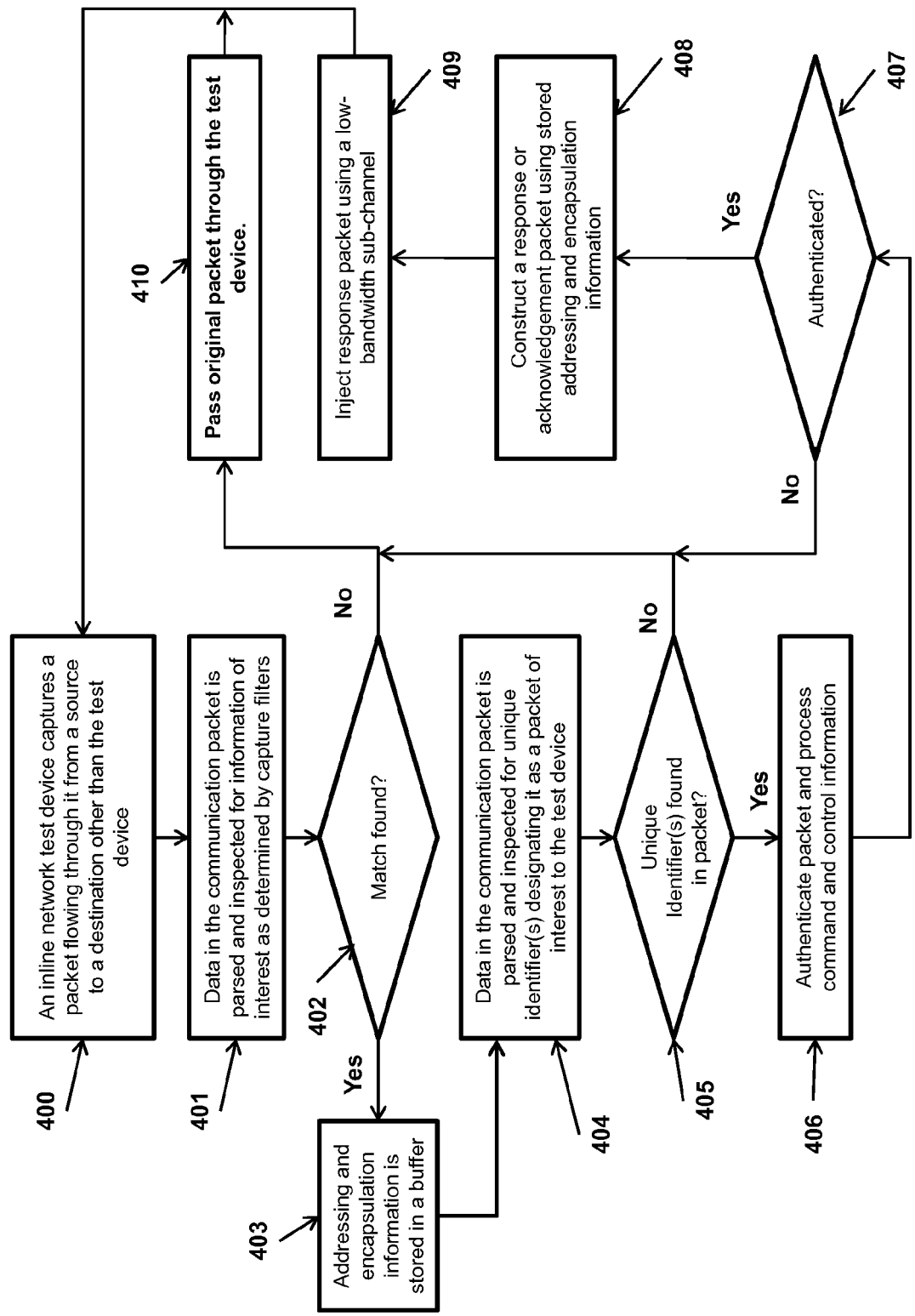
FIG. 5 is a flow chart of the algorithm that may be performed at the test device; and, FIG. 6 is a schematic diagram of a test device.

FIG. 5 is a partial flow chart of the algorithm that may be performed at the test device. In an operational block 400, a test device 104 captures a packet 103 communicated over a communication network 100; the source address of the captured packet identifies the source device 101, and the destination address of the packet identifies the destination device 102; both devices are different from the test device 104. In operational block 401, the test device scans packet's 103 headers and payload using a packet header parser for network addresses and encapsulations needed to communicate on network 100. If addressing is not found 402, packet 103 is passed through test device 104 back onto network 100. In operational block 403, the test device 104 stores discovered network addresses and encapsulations in a buffer. In operational block 404, test device 104 scans the captured packet's 103 payload searching for predefined authentication patterns. In operational block 404, the test device 104 determines whether any of the authentication patterns is found in the packet's payload. If none of the authentication patterns are found 405, operation advances and the packet 103 is passed through test device 104 back onto network 100 to the destination address of the packet 103 without any changes made to the packet 103. In operational block 406 the packet 103 is authenticated and determined if an ID for test device 104 is present. A command parser extracts any commands and information of interest to test device 104 if authenticated 407. In operation block 408, the test device uses the captured encapsulation and addressing information captured in block 403 and constructs a response/acknowledgement packet to the source 101 which is presumed to be the control device 150. The response/acknowledgement packet is held in a FIFO buffer while it is waiting to be injected during an idle frame using a sub-channel in operational block 409. At the end of the operation the test device returns to operational block 400 to capture the next packet.

Figure 6:
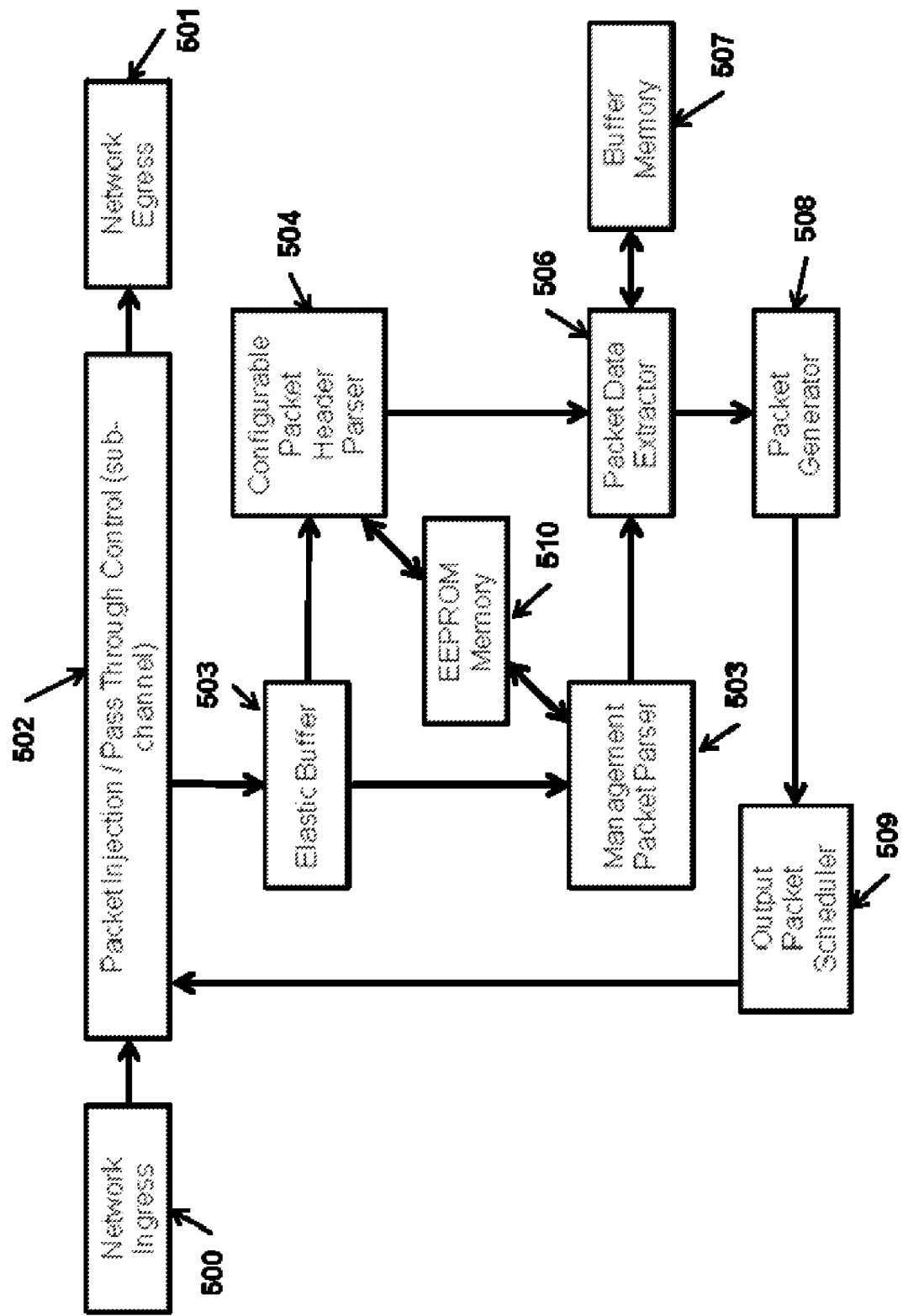

FIG. 6 shows a functional flow diagram according to one embodiment of the present invention. A functional block 500 shows an ingress point into the test device 104 from a source 101. A functional block 501 shows an egress point from the test device to a destination 102. The ingress 500 and egress 501 can be any electrical, optical, wireless or other known or unknown method used for communicating information over the communications network 100. A functional block 502 is a packet injection pass through control commonly referred to as a sub-channel. The sub-channel 502 is capable of receiving and injection packets on the network 100. The sub-channel 502 receives a packets 103 into an elastic buffer 503 as they are received. The packets in buffer 503 are extracted from the buffer 503 by a configurable packet header parser 504 and a management packet parser 505. The packet header parser 504 inspects the packet 103 and identifies key header and payload information locations for a packet data extractor 506. These can include network addresses such as MAC or IP addresses or other layer 2, layer 3 or and other OSI layers that enable communications to be carried of known or unknown networks. The management packet parser 505 examines the packet 103 for authentication patters, IDs, commands and any other information deemed of interest for the test device 104. The authentication patterns including IDs, commands, etc. are stored in a memory component 510 of the test device 104. The memory component 510 may be any non-volatile memory such as an Electrically Erasable Programmable Read-Only Memory EEPORM, flash memory, Ferroelectric RAM, application-specific integrated circuit (ASIC), any writable memory known and unknown or combination thereof. Any important information is flagged for extraction or processed. The packet data extractor 506 takes information of interest identified by the management packet parser 505 and/or the packet header parser 504 and extracts the information of interest into a buffer memory 507. Information of interest can be protocol headers, network addresses, header fields, data strings, counts, full packets or any combination of data present in packet 103. The memory component 507 can be a combination of RAM, ROM or other memory and storage technology known and unknown today In particular, the memory component 507 has the set of network addresses collected from the packets forwarded by the test device 104 onto the network 100 and the information of interest collected by the packet data extractor 506.

A packet generator 508 takes data from the buffer memory 507 and creates response or acknowledgement packets for sending to the source 101 or destination 102 or any other location as determined at the test device 104 and based on the data or instructions learned while processing/parsing the packet 103. Once packet the generator 508 constructs a valid packet, a functional block 509 acts as an output buffer/scheduler for the sub-channel 502. When an idle period is determined, the sub-channel 502 receives the response/acknowledgement packet from the scheduler 509 and inserts it in the network 100 in accordance with the addressing contained in the packet.

The components of the test device may be implemented in a combination of software and hardware such as an Application Specific Integrated Circuit (ASIC), Field programmable Gate Array (FPGA), network processor, system on a chip such as an FPGA with integrated ARM or micro processor, Complex Programmable Logic Device (CPLD), Erasable programmable logic device (EPLD), Simple programmable logic device (SPLD), or macrocell array.

In one embodiment, a system includes an Unaddressed Network Device 104, which is inline to the communication stream and is being discovered by an upstream system. The unaddressed device 104 contains a unique identifier and inspects all packets passing through the device and, with a programmable packet header parser that is aware of traditional packet headers and may be configured to learn new header types, learns the encapsulation of the network needed for communication from a Hello discovery packet received from a control element or from network packet headers of traffic flowing through the device. The unaddressed device 104 collects candidate network addresses that can be used to communicate with it, e.g. destination IP and MAC addresses of every packet passing through the device. If a packet passing through the device 104 has a mark that it is a discovery/communications packet, it is responded to with the device's ID and one or more candidate network addresses for communication with the unaddressed device 104.

The system further includes Command and Control elements 150, also referred to as the Packet Routing Engines (PRE) and a System Manager (SM). The control element 150 manages and controls the unaddressed network device 104, and sends out discovery packets to locate unaddressed devices in the network. The control element 150 maintains a set of downstream network addresses which belong to downstream devices such that packets originated at the control device 150 would travel across the unaddressed device 104 if the packets have a destination address one from the set of downstream IP devices received from the unaddressed network device 104. The control element 150 creates and transmits control and management packets (SOCP packets) intended to the unaddressed test device 104 and having a destination address downstream of the unaddressed network device 104. The SOCP packets may contain a unique identifier of the unaddressed network device 104 and other authentication pattern(s), a sequence number; the packets may be encrypted.

In operation, the Command and control element 150 chooses a network address or subnet where an unaddressed network device may reside to be discovered. A discovery packet is created and directed to the target network address. The "undiscovered" unaddressed network element inspects every packet for the discovery packet identifiers. The unaddressed network device collects candidate network addresses for communication with the control element 150. By way of example, the device may be instructed to look at all frames on the link and perform matched filter-logic over each.

The unaddressed network device 104 learns the network encapsulation of a detected discovery packet by inspecting the headers preceding the command and control information as depicted in FIGS. 3 and 4. This network encapsulation is then stored in the Memory Component for later use to transmit packets on the network 100.

When a discovery packet is detected it is parsed to see if a response should be crafted. When a discovery packet is detected for response, an SOCP packet is created; the packet contains the learned encapsulation, and one or more candidate network addresses for use by the control device 150 when communication with the unaddressed device 104. The packet may further contain command and control info; the packet has a source address one from the set of collected network addresses, and a destination address which is the same as the source address of the discovery packet.

When the command and control element 150 receives the discovery response packet (test device identification packet), network addresses and other command and control data are extracted, an address table for communications back to the unaddressed device is created. The command and control element establishes a connection to the unaddressed network device.

Acknowledgements and encryption keys may be exchanged.

In one embodiment, the network 100 is an IP-based network, and the collected network addresses include IP addresses of the passing packets. The source and destination addresses of the discovery packet, test device identification packet, request packet, test result packet, etc. are IP addresses.

Differently from conventional protocols such as DHCP, the aforedescribed method does not require the unaddressed device to initially or actively obtain a network address, listen on a particular port for a special messages, be tied to a single address obtained, respond to broadcast or multicast messages, depend on known network encapsulations. This is advantageous because it significantly reduces management concerns, does not require a pool of known addresses that need to be maintained, allows the elements to quickly adapt to network address changes and allows elements to automatically work in any network infrastructure without outside configuration or setup.

The aforedescribed method allows discovery and communication with an unaddressed network device such as the test device 104 by collecting and using addresses of other elements downstream of the device. In order to establish communication between two devices, the unaddressed device 104 must provide one or more network addresses that can be used to communicate with the unaddressed device. After this is done, a spoofed communication session can be established.

Advantageously, the method presented herein allows the unaddressed device to be discovered over a multitude of encapsulations. Traditional methods require elements to be configured to work in the specific encapsulations used in the network. This requires knowledge of the network and encapsulations and availability of addresses to use in said network. By inspecting the encapsulations of the packets traversing the network, the device 104 may automatically learn the headers needed to properly communicate on said network. This is advantageous because it greatly reduced the management, required addresses and time required to deploy infrastructure in a network.

The aforedescribed test device 104 is a protocol-generic (or "protocol-unaware") test device that is capable of monitoring traffic communicated over a communication network and identify packets within such traffic that are of interest to the test device. The method is protocol-generic and thus does not require that the test device have a prior knowledge about the communication protocol being used in order for the test device to be able to identify packets that are intended to the test device 104. Thus, the protocol-generic test device can be employed and dynamically adapted to any communication protocol that may be utilized on the communication network without requiring any modification to the test device.

In certain embodiments, information that is intended for an test device may be thought of as a packet within the packet. That is, a portion of the packet's payload intended for the test device may be thought of as a packet, wherein the overall packet may be referred to as a "carrying packet," or "envelope packet," and the portion of the overall packet that is intended for the test device may be referred to as an "embedded packet," or "message packet". Just as an envelope may carry a letter (that itself carries certain pieces of information), an envelope packet may carry a message packet that includes information intended for the test device.

The carrying packet like an envelope contains the addressing information needed to get a packet from one segment of a network to another segment, much like a letter with an address flows in the mail from one address in a city to another. Accordingly, the envelope portion of the carrying packet contains addressing information such as IP and MAC addresses that are of interest to the test device. Though this addressing information is not intended for the test device, it is of interest because it may be used by the test device to surreptitiously communicate on the communications network and discover the network encapsulations used.

The message portion of the carrying packet (i.e., the portion intended for the test device) may be identified by an identifier included in the payload of such carrying packet. The message portion of the carrying packet may include information intended for the test device, such as test or configuration information. The packet 103 may be a request packet matching specific authentication patterns stored in the test device 104, wherein the test or configuration information contains one or more test/configuration parameters. In response to the request packet, in step 408 (FIG. 5), the test device sends a test result packet, also referred to as a reply packet, which may contain a confirmation that a command has been executed and/or may provide a test result defined by the test parameter; the test result may be e.g. data obtained by monitoring network traffic passing through the test device 104. The test result is encapsulated into a test result packet. The test result packet includes one of the authentication patterns e.g. the ID number of the test device 104. The test device 104 then sends the test result packet to a source address of the request packet, wherein a source address of the test result packet is one from the set of collected network addresses and identifies a downstream device that is downstream from the test device 104 with respect to packets originated at the device having the source address of the request packet; the network address of downstream device is not necessarily the same device as used for sending the test device identification packet in the discovery procedure. Additionally, various test result packets may use addresses of different downstream devices, as well as the test device identification packets if more than one such packet is sent from the test device. Preferably, the test device 104 regularly provides new addresses from the set of collected network addresses to the control device 150, in the payload of test result packets and/or as varying source addresses of the test result packets. This technique automatically mitigates configuration changes in the network 100.

By way of example, the test parameter may define a filter for network monitoring or a command to the test device. The test device 104 may apply the filter so as to get only particular packets e.g. selected by a byte pattern, destination or a protocol, and provide related test results to the device which sent the request packet.

The payload of the test result packet may include one or more addresses from the set of collected network addresses.

The test parameter may be a test packet, or a portion of such packet, for sending to a device or network under test from the test device 104. A confirmation that this test has been executed is sent to the control device 150 in a test result packet.

The carrying packet may be encrypted.

When the test device 104 finds one of the authentication patterns in the packet 103, i.e. recognizes the packet 103 as a request packet intended to the test device 104, the test device 104 preferably terminates the packet 103 and does not forward the packet to its destination address so that the packet would not disrupt a downstream network element the packet were not intended for.

In other words, the unaddressed network device 104 inspects and buffers enough of every packet passing through it to determine if it is targeted for the device 104. If the packet is targeted for the device 104, the packet is received into the device, but terminated from the network in step 408 (FIG. 5). If the special identifiers are not found, the packet is transmitted onto the network unaltered.

In the description above, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

We claim:

1. A method of testing a network comprising:
   (a) providing a test device connected inline in the network, wherein the test device has one or more authentication patterns stored therein, and wherein the test device has memory for storing a set of collected network addresses;
   (b) examining received packets at the test device;
   (c) if one of the received packets includes none of the authentication patterns, adding a destination address or a source address of said packet to a set of collected network addresses, and forwarding said packet from the test device to the destination address of said packet;
   (d) originating a test device identification packet, at the test device wherein a source address of the test device identification packet is one from the set of collected network addresses, and wherein the test device identification packet includes one of the authentication patterns;
   (e) if one of the received packets is a request packet matching any of the authentication patterns and having a test parameter,
      forming a test result packet at the test device, wherein the test result packet includes one of the authentication patterns; and,
      sending the test result packet from the test device to a source address of the request packet, wherein a source address of the test result packet is one from the set of collected network addresses and identifies a first downstream device that is downstream from the test device with respect to packets originated at the device having the source address of the request packet.

2. The method as defined in claim 1,
   wherein the authentication patterns include a discovery pattern, and one of the received packets is a discovery packet having the discovery pattern,
   wherein the test device sends the test device identification packet in response to receiving the discovery packet, and a destination address of the test device identification packet is the source address of the discovery packet.

3. The method as defined in claim 2, wherein the source address of the test device identification packet identifies a second downstream device different from the first downstream device.

4. The method as defined in claim 1 or 2, wherein an encapsulation of the test result packet is based on an encapsulation of the request packet or the discovery packet.

5. The method as defined in claim 1, wherein the authentication patterns include an identification number of the test device, and the test device identification packet includes the identification number of the test device.

6. The method as defined in claim 1, wherein a payload of the test device identification packet or the test result packet includes one or more addresses from the set of collected network addresses.

7. The method as defined in claim 1 wherein the test parameter defines a filter for network monitoring.

8. The method as defined in claim 1 wherein the test parameter is a command to the test device.

9. The method as defined in claim 1 wherein the set of collected network addresses includes destination addresses and source addresses of forwarded packets.

10. The method as defined in claim 1 wherein the request packet is terminated at the test device.

11. The method as defined in claim 10 wherein the test parameter is a portion of a test packet for sending to a device under test from the test device.

12. The method as defined in claim 1 wherein the examining of the received packets includes comparison of packet portions in a predetermined location within a payload of the received packet to one of the authentication patterns.

13. The method as defined in claim 1 wherein the test result packet includes a test result defined by the test parameter.

14. The method as defined in claim 13 wherein test parameter is a command and the test result is a confirmation that the command has been executed.

15. The method as defined in claim 13 wherein the test result includes a portion of one of the received packets wherein said packet includes none of the authentication patterns.

16. The method as defined in claim 1 wherein the network is an IP-based network, and wherein the set of collected network addresses includes IP addresses.

17. At an unaddressed device connected inline in a network, a method of communication, comprising:
   (a) examining received packets at the unaddressed device;
   (b) if one of the received packets includes none of one or more authentication patterns stored within the unaddressed device, adding a destination address or a source address of said packet to a set of collected network addresses, and forwarding said packet from the unaddressed device to the destination address of said packet;
   (c) originating a device identification packet, at the unaddressed device, wherein a source address of the device identification packet is one from the set of collected network addresses, and wherein the device identification packet includes one of the authentication patterns;
   (d) if one of the received packets is a request packet matching any of the authentication patterns,
      forming a reply packet at the unaddressed device, wherein the reply packet includes one of the authentication patterns, and
      sending the reply packet from the unaddressed device to a source address of the request packet, wherein a source address of the reply packet is one from the set of collected network addresses and identifies a downstream device that is downstream from the unaddressed device with respect to packets originated at the device having the source address of the request packet.

18. The method as defined in claim 17, wherein the authentication patterns include an identification number of the unaddressed device, and the device identification packet includes the identification number of the test device.

19. The method as defined in claim 17, wherein a payload of the device identification packet or the reply packet includes one or more addresses from the set of collected network addresses.

20. The method as defined in claim 17,
   wherein the authentication patterns include a discovery pattern, and one of the received packets is a discovery packet having the discovery pattern,
   wherein the unaddressed device sends the device identification packet in response to receiving the discovery packet, and a destination address of the device identification packet is the source address of the discovery packet.

21. The method as defined in claim 17, wherein the request packet is terminated at the unaddressed device.

* * * * *